United States Patent [19]
Böttger et al.

[11] Patent Number: 4,818,580
[45] Date of Patent: Apr. 4, 1989

[54] HOUSING COMPONENT PART MADE OF A LAMINATED MULTI-LAYERED WOVEN LAMINATE

[75] Inventors: Wolfgang Böttger, Ködnitz; Kurt Biedermann, Kulmbach, both of Fed. Rep. of Germany

[73] Assignee: Vorwerk & Co. Interholding GmbH, Wuppertal, Fed. Rep. of Germany

[21] Appl. No.: 69,167

[22] Filed: Jul. 2, 1987

[30] Foreign Application Priority Data

Jul. 2, 1986 [DE] Fed. Rep. of Germany ... 8617619[U]

[51] Int. Cl.4 .............................................. B32B 7/00
[52] U.S. Cl. .................................... 428/113; 428/218; 428/251; 428/257; 428/268; 428/273
[58] Field of Search ............... 428/113, 218, 251, 257, 428/268, 273

[56] References Cited

U.S. PATENT DOCUMENTS 4,131,664 12/1978 Flowers et al. ...................... 428/218
4,510,198 4/1985 Rheaume ............................ 428/251

Primary Examiner—Marion C. McCamish
Attorney, Agent, or Firm—Walter Ottesen

[57] ABSTRACT

A housing component part includes a multi-layer weave impregnated with resin. The upper weave layer has a very fine structure and the lower weave layer has a structure coarser than the upper weave layer. Tying fibers interconnect the upper and lower weaves to form a unit which is thoroughly impregnated with the resin. Because of the very fine structure of the upper weave layer, the outer surface of this layer is hard and forms a good surface for receiving an enamel thereon.

6 Claims, 4 Drawing Sheets

HOUSING COMPONENT PART MADE OF A LAMINATED MULTI-LAYERED WOVEN LAMINATE

FIELD OF THE INVENTION

The invention relates to a component part of a housing such as the hood of the motor compartment of a motor vehicle, fender or the like made of laminated multi-layered woven material. The component part includes a woven multi-layered weave which is embedded in laminating means and its contour is made to a predetermined form.

BACKGROUND OF THE INVENTION

Housing component parts of the kind described above are known in that a prefabricated continuous flat weave is laminated and from which "clam shell" halves are produced in molds. For this purpose, a multi-layered weave is utilized such as disclosed in U.S. Pat. No. 4,379,798 which has coarsely structured similar surfaces on both sides.

Because of the similarity of the weave structure on both sides, this solution has the disadvantage of a relatively poor flat deforming capability as well as a poor surface structure after lamination so that a high quality surface appearance cannot be obtained with this structure.

A further disadvantage is seen in the deficient deformability which does not permit many deformations to be made without a visible reduction in quality with respect to the surfaces exposed to view.

With respect to the foregoing, adequate strength of the material combined with a good appearance of the material surface are of importance also for finished laminated housing parts.

SUMMARY OF THE INVENTION

It is an object of the invention to provide a woven housing component part which avoids the above-mentioned disadvantages and which has a smooth-surface appearance while at the same time is easily deformable with a very high material strength.

The housing component part according to the invention includes a weave which has at least two interconnected layers with the upper layer having a very fine structure and the lower layer having a coarse structure.

According to a further feature of the invention, the very fine layer defines the surface of the housing component part and the coarse layer is configured so as to be very deformable.

Pursuant to a further embodiment of the invention, the intermediate layers are adapted to the upper and lower layers with respect to their deformability. In addition, the layer has a very high density of woven material which is necessary to achieve a high strength.

Finally, the lamination means is completely and uniformly embedded into the weave structure.

The advantages of the invention are seen especially in that a laminated component housing part is provided which has a virtually smooth surface while at the same time having good deformation characteristics and high strength in the upper surface. These advantages are supplemented by the light construction while retaining a characteristic which otherwise is only available in materials such as sheet steel.

A further advantage of the invention is its resistance to corrosion against the influences of the environment when compared to conventional materials. Furthermore, the invention affords an economic advantage with respect to manufacture in that the weave is placed in a mold and then laminated with appropriate materials without the need to use conventional methods such as stamping and pressing which involve a high energy consumption.

BRIEF DESCRIPTION OF THE DRAWING

The invention will now be described with reference to the drawing wherein.

DESCRIPTION OF THE PREFERRED EMBODIMENTS OF THE INVENTION

Figure 1:
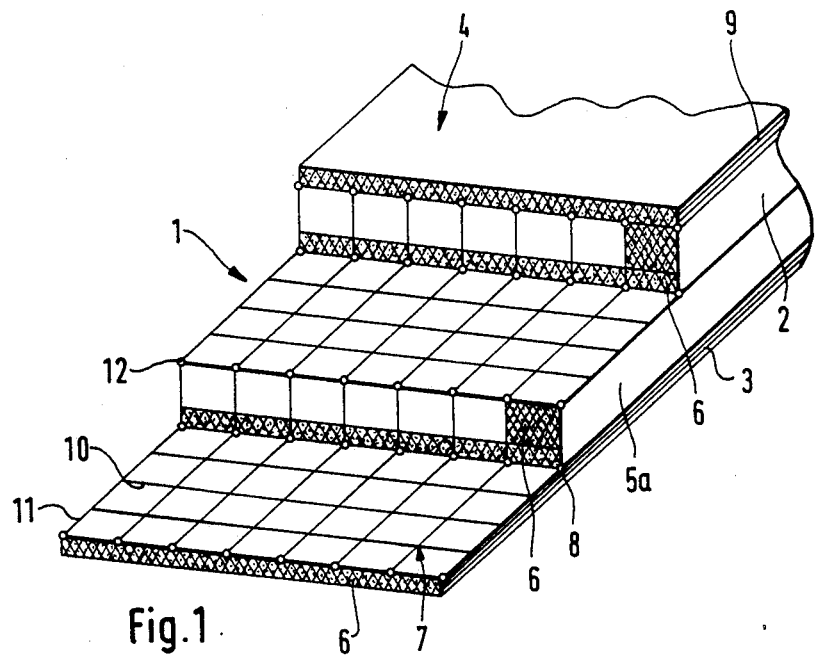
FIG. 1 shows a perspective schematic view of a laminated housing component part according to the invention made of a multi-layer weave.

Referring now to FIG. 1, reference numeral 1 indicates the entire woven ply. In the example shown, this woven ply comprises three layers 2, 5a and 3 of which the layer 2 has a very fine weave structure and the layer 3 a coarse weave structure. The layer 5a is disposed between the upper layer 2 and the lower layer 3 and is adapted with respect to its structure to these layers. All layers 2, 5a and 3 are configured as so called multi-layer weaves in that the individual layers are interconnected by means of tying fiber yarn 8. The layers 2, 5a and 3 comprise woven glass fibers or similar industrial fibers and can have respectively different degrees of coarse structure when considered in the context of the weave used.

The three layers 2, 5a and 3 can be expanded to include other layers if desired. All of the layers are woven at the same time by means of a special arrangement of a loom which makes it possible to provide different weave structures in the individual layers with the latter being interconnected by means of the tying fibers 8. The tying fibers are made of the same material as the sets of warp and fill fibers arranged in mutually parallel planes. More specifically, the multi-layer weave is not made up of a plurality of individual separate woven layers which are separately interconnected by connecting pieces; instead, the multi-layer weave according to a feature of the invention is a common multi-layer weave produced in one weave operation in which the connection pieces are made of the threads of the tying fibers so that these tying fibers and the layers conjointly constitute a unit. The nature of such tying threads or fiber is shown in FIG. 1 of U.S. Pat. No. 4,379,798 incorporated herein by reference.

The multi-layer weave of the component housing part of the invention is a single flat weave which is made of different layers which are held together by the tying threads 8 made of the same material as the rest of the weave fibers. The tying threads 8 are a tying chain which extends between and interlaces individual weave layers.

Figure 2:
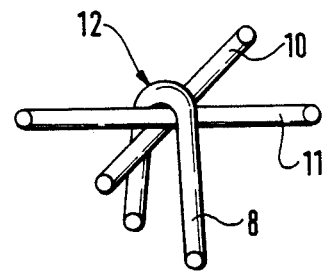
FIG. 2 is a schematic representation of a connecting node of the multi-layer weave structure of the laminated housing component part shown in FIG. 1.
Figure 3:
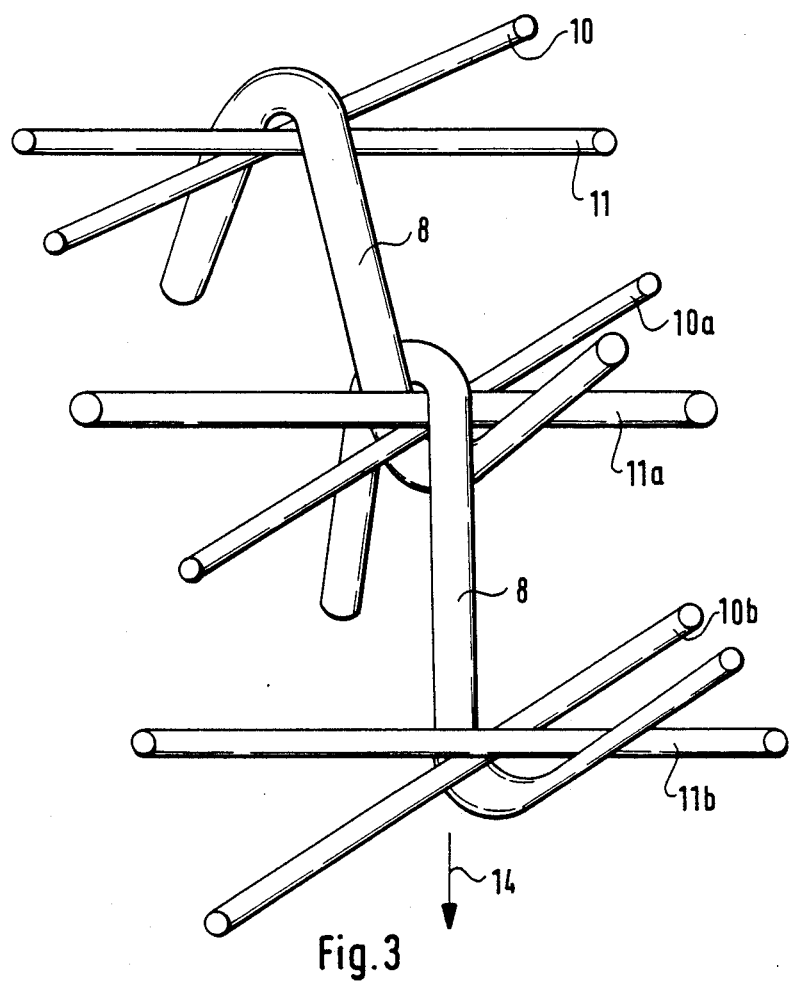
FIG. 3 is a schematic representation of the weave structure of the three layers of the three-layer weave of the laminated housing component part of FIG. 1; and, FIG. 4 is a schematic section view of the multi-layered weave according to the invention.

In FIG. 1, reference numeral 10 identifies a fill fiber and reference numeral 11 a warp fiber. The connecting node 12 is schematically represented in FIG. 2 to show how the fill, warp and tying fibers are interconnected to form the node. On the other hand, FIG. 3 is a schematic representation of the multi-layer weave wherein the overlapping fill and warp fibers (10, 11) of the first layer define a very fine structure (satin weave) and the fill and warp fibers (10a, 11a) of the second layer define a coarser weave than the first layer. The overlapping fill and warp fibers (10b, 11b) of the third layer define a still coarser weave. The multi-layer weave can be continued in the direction of the arrow 14 with layers of ever increasing coarseness.

Housing component parts of this kind shown in FIG. 1 are laminated by means of a suitable resin in that the above-mentioned multi-layer weave 1 is cured in a mold and allowed to cure in this mold to the end shape desired.

Figure 4:
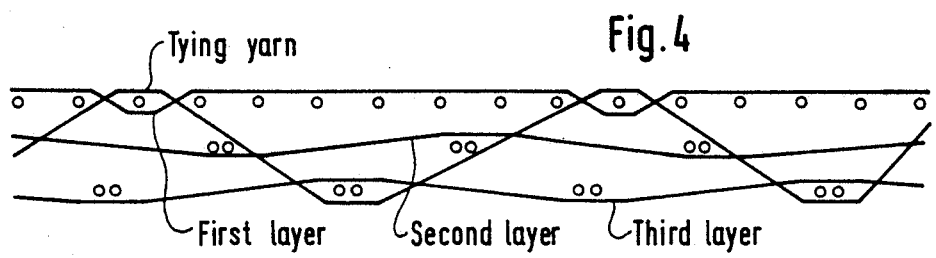

The laminating means 6 of the woven ply 1 shown in FIG. 1 is not made up of individual layers and held by the tying fibers; instead, the ply 1 itself is a thin unit of a plurality of woven layers lying directly on top of one another with the respective layers having respectively different weave structures (coarseness) shown in FIG. 4. When the layers 2, 5a and 3 are thoroughly impregnated with laminating means 6 in the form of a resin, the laminating means 6 and the layers of weave structure 7 conjointly define a single complex block. The lamination means preferably comprises polyester resin and epoxy resin. In this connection, the resin XB 3052a and hardener XB 3052b from the Ciba-Geigy Corporation would be suitable. A Thermoplast such as Polyamid, Peek or the like could also be used.

It is of importance that the upper layer 2 having the fine structure is made very accessible to the laminating means 9. To achieve this accessibility, the intermediate layer 5a lying beneath the layer 2 is always configured to be coarser.

The formation of the multi-layer weave of the invention is such that the laminating resin penetrates all of the weave layers unifrrmly via capillary action notwithstanding the fact that the upper layer provides a surface to which a coating of varnish or enamel can be applied. For this purpose, the upper layer is very finely woven. At the same time, the invention achieves a very high weave strength, especially with respect to material density, in the upper layer 2 and the intermediate layers as well as the lower layer 3 are very elastic and so are adaptable to any desired laminating mold in which the housing component part is cured and formed. An example of a three-layered weave according to the invention is given below.

| Weave | First Layer Atlas 7/1 (satin weave) | Second Layer two fiber | Third Layer two fiber | Tying Fiber |
|---|---|---|---|---|
| Number of warp fibers/cm | 22 | 11 | 11 | 5.5 |
| Warp fiber material | EC 9-68 | EC 11-204 | EC 11-204 | EC 5-11 × 2 |
| Number of fill fibers/cm | 21 | 10.5 | 10.5 | — |
| Fill fiber material | EC 9-68 | EC 11-204 | EC 11-204 | — |
| Weight (g/m$^2$) | 296 | 445 | 445 | 10 |

Total weight: 1196 g/m$^2$
Thickness of multilayered weave: 1.2 mm
Laminate thickness at 60% fiber volume content: 0.79 mm
Proportions of warp to fill=52%: 48%

Component housing parts of the kind described above which are produced using this weave technology can be produced in one working step to form laminated housing component parts which are easy to handle when processing the same and have a smooth and very hard surface after they are manufactured. Housing parts of this kind function especially as chassis parts that have a top surface visible to view which must be of absolutely smooth structure when formed and, on the other hand, it is unimportant as to the structure of the inner top surface which can even be turned to an advantage because of the coarse structure which serves to attenuate noise.

It is understood that the foregoing description is that of the preferred embodiments of the invention and that various changes and modifications may be made thereto without departing from the spirit and scope of the invention as defined in the appended claims.

What is claimed is:

1. A housing component part having a contour made into predetermined shape, comprising:
    an upper woven layer having warps and fill fibers defining a very fine structure of first openings;
    a lower woven layer disposed beneath said upper layer and having warp and fill fibers defining a coarse structure of second openings larger than said first openings;
    tying fiber means for interconnecting said layers to form a single multi-layered woven laminate; and,
    laminating means impregnating said layers via capillary action through said second openings into said first openings so as to form a multi-layered woven laminate.

2. The housing component part of claim 1, wherein said component housing part of a motor vehicle, said upper weave layer haivng a top surface facing away from said lower layer and defining the outer surface of said component housing part.

3. The housing component part of claim 1, said lower layer being very deformable.

4. The housing component part of claim 1, comprising a third layer interposed between said upper and lower layers and being deformable by an amount more than said top layer and less than said lower layer.

5. The housing component part of claim 1, wherein said upper layer has a density of woven material that is higher than the density of the woven material of said lower layer.

6. The housing component part of claim 1, wherein said laminating means is uniformly impregnated in said multi-layered woven laminate.

* * * * *

UNITED STATES PATENT AND TRADEMARK OFFICE
CERTIFICATE OF CORRECTION

PATENT NO. : 4,818,580

DATED : April 4, 1989

INVENTOR(S) : Wolfgang Böttger and Kurt Biedermann

It is certified that error appears in the above-identified patent and that said Letters Patent is hereby corrected as shown below:

The table appearing in columns 3 and 4 should read as follows:

|  | First Layer | Second Layer | Third Layer | Tying Fiber |
|---|---|---|---|---|
| Weave | Atlas 7/1 (satin weave) | two fiber | two fiber |  |
| Number of warp fibers/cm | 22 | 11 | 11 | 5.5 |
| Warp fiber material | EC 9-68 | EC 11-204 | EC 11-204 | EC 5-11 x 2 |
| Number of fill fibers/cm | 21 | 10.5 | 10.5 | --- |
| Fill fiber material | EC 9-68 | EC 11-204 | EC 11-204 | --- |
| Weight (g/m²) | 296 | 445 | 445 | 10 |

UNITED STATES PATENT AND TRADEMARK OFFICE
CERTIFICATE OF CORRECTION

PATENT NO. : 4,818,580

DATED : April 4, 1989

INVENTOR(S) : Wolfgang Böttger and Kurt Biedermann

It is certified that error appears in the above-identified patent and that said Letters Patent is hereby corrected as shown below:

In column 4, line 50: insert -- is part -- between "part" and "of".

In column 4, line 51: delete "haivng" and substitute -- having -- therefor.

In column 3, line 25: delete "shown in FIG. 4".

In column 3, line 43: delete "unifrrmly" and substitute -- uniformly -- therefor.

Signed and Sealed this

Thirtieth Day of January, 1990

*Attest:*

JEFFREY M. SAMUELS

*Attesting Officer*   Acting Commissioner of Patents and Trademarks